(12) United States Patent
Takahashi et al.

(10) Patent No.: US 12,183,072 B2
(45) Date of Patent: Dec. 31, 2024

(54) PROGRAM AND COMMUNICATIONS SYSTEM

(71) Applicant: Sekisui House, LTD.

(72) Inventors: Junpei Takahashi, Osaka (JP); Kentaro Kaneyasu, Osaka (JP); Yoshinori Sumitomo, Osaka (JP); Daisuke Tabuchi, Osaka (JP)

(73) Assignee: Sekisui House, LTD., Osaka (JP)

( * ) Notice: Subject to any disclaimer, the term of this patent is extended or adjusted under 35 U.S.C. 154(b) by 345 days.

(21) Appl. No.: 17/783,410

(22) PCT Filed: Jan. 19, 2021

(86) PCT No.: PCT/JP2021/001675
§ 371 (c)(1),
(2) Date: Jun. 8, 2022

(87) PCT Pub. No.: WO2021/153348
PCT Pub. Date: Aug. 5, 2021

(65) Prior Publication Data
US 2023/0011385 A1    Jan. 12, 2023

(30) Foreign Application Priority Data
Jan. 31, 2020    (JP) .................................. 2020-014327

(51) Int. Cl.
*G06V 20/10*  (2022.01)
*G06Q 50/08*  (2012.01)
*G06T 7/00*   (2017.01)

(52) U.S. Cl.
CPC .......... *G06V 20/176* (2022.01); *G06T 7/0008* (2013.01); *G06Q 50/08* (2013.01)

(58) Field of Classification Search
CPC ..... G06V 20/176; G06T 7/0008; G06Q 50/08
See application file for complete search history.

(56) References Cited

U.S. PATENT DOCUMENTS 11,354,759 B2 * 6/2022 Kim ................. G06Q 10/06398
2017/0116669 A1 * 4/2017 Wickstrom ............ G06Q 40/03
(Continued)

FOREIGN PATENT DOCUMENTS

| JP | 2009-217694 A | 9/2009 |
| JP | 2011-129016 A | 6/2011 |
| JP | 2017-182545 A | 10/2017 |

*Primary Examiner* — Utpal D Shah
(74) *Attorney, Agent, or Firm* — Jordan and Koda, PLLC; Steven P. Koda, Esq.

(57) ABSTRACT

A photograph of a component after construction is acquired. A first program implemented on a communication terminal device displays a construction photograph solicitation icon soliciting a construction photograph on a display panel, when there is a component without the construction photograph in a first database stored in a memory of a second server. When accepting a selection of the construction photograph solicitation icon, the first program launches an imaging program and acquires photograph data. Alternatively, the first program acquires photograph data selected from a folder. The first program sends the acquired photograph data to the second server through a first server. A third program of the second server registers the sent photograph data in a second database. An operator selects one photograph from photographs shown by a plurality pieces of photograph data registered in the second database, and registers the photograph data of the selected photograph in the first database.

9 Claims, 11 Drawing Sheets

(56) References Cited

U.S. PATENT DOCUMENTS

| | | | |
|---|---|---|---|
| 2017/0161657 A1* | 6/2017 | Barnes | G06Q 10/0633 |
| 2019/0347751 A1* | 11/2019 | Gupta | G06Q 10/10 |
| 2021/0256457 A1* | 8/2021 | Saiki | G06Q 10/06314 |
| 2022/0004166 A1* | 1/2022 | Saiki | G05B 19/4155 |
| 2022/0327165 A1* | 10/2022 | Utoh | G06F 16/93 |
| 2022/0405672 A1* | 12/2022 | Rolston | G06Q 10/06312 |
| 2023/0104230 A1* | 4/2023 | Jung | G06Q 50/08 |
| | | | 345/419 |

* cited by examiner

FIG. 2

FIRST DATABASE

| HOUSE ID | HOUSE NAME | LARGE PART | SMALL PART | TYPE | ARTICLE NAME | ARTICLE CODE | SPECIFICATION INFORMATION | CONSTRUCTION MANUAL | PRESENCE/ABSENCE INFORMATION | CONSTRUCTION PHOTOGRAPH | |
|---|---|---|---|---|---|---|---|---|---|---|---|
| ABC | TARO SEKISUI | SEPARATION WALL | TOP FLOOR | HEAT INSULATING MATERIAL | HEAT INSULATING MATERIAL A | A001 | SPECIFICATION FILE 01 | CONSTRUCTION FILE 01 | 1 | CONSTRUCTION PHOTOGRAPH DATA 01 | ... |
| | | | GENERAL FLOOR | HEAT INSULATING MATERIAL | HEAT INSULATING MATERIAL D | A012 | SPECIFICATION FILE 02 | CONSTRUCTION FILE 02 | 1 | CONSTRUCTION PHOTOGRAPH DATA 02 | ... |
| | | | LEAN-TO SECTION | HEAT INSULATING MATERIAL | HEAT INSULATING MATERIAL F | B031 | SPECIFICATION FILE 03 | CONSTRUCTION FILE 03 | 0 | — | ... |
| | | | ... | ... | ... | ... | ... | ... | ... | ... | ... |
| | | PARTITION WALL | TOP FLOOR | HEAT INSULATING MATERIAL | HEAT INSULATING MATERIAL H | C012 | SPECIFICATION FILE 04 | CONSTRUCTION FILE 04 | 1 | CONSTRUCTION PHOTOGRAPH DATA 03 | ... |
| | | | GENERAL FLOOR | HEAT INSULATING MATERIAL | HEAT INSULATING MATERIAL J | C151 | SPECIFICATION FILE 05 | CONSTRUCTION FILE 05 | 1 | CONSTRUCTION PHOTOGRAPH DATA 04 | ... |
| | | | LEAN-TO SECTION | HEAT INSULATING MATERIAL | HEAT INSULATING MATERIAL M | D103 | SPECIFICATION FILE 06 | CONSTRUCTION FILE 06 | 0 | — | ... |
| | | | ... | ... | ... | ... | ... | ... | ... | ... | ... |
| | | ... | | | | | ... | | | | |
| ... | ... | | | | | | | | | | |

FIG. 3

SECOND DATABASE

| ARTICLE CODE | USER ID | EMAIL ADDRESS | PHOTOGRAPH DATA |
|---|---|---|---|
| B031 | G015K | abc@012345.com | PHOTOGRAPH DATA A012-01 |
| | N002L | def@123456.com | PHOTOGRAPH DATA A012-02 |
| | F013J | ghi@234567.com | PHOTOGRAPH DATA A012-03 |
| | ⋮ | ⋮ | ⋮ |
| D103 | B002F | jkl@345678.com | PHOTOGRAPH DATA C151-01 |
| | N002L | def@123456.com | PHOTOGRAPH DATA C151-02 |
| | ⋮ | ⋮ | ⋮ |
| ⋮ | | ⋮ | |

FIG. 7A  FIRST SCREEN
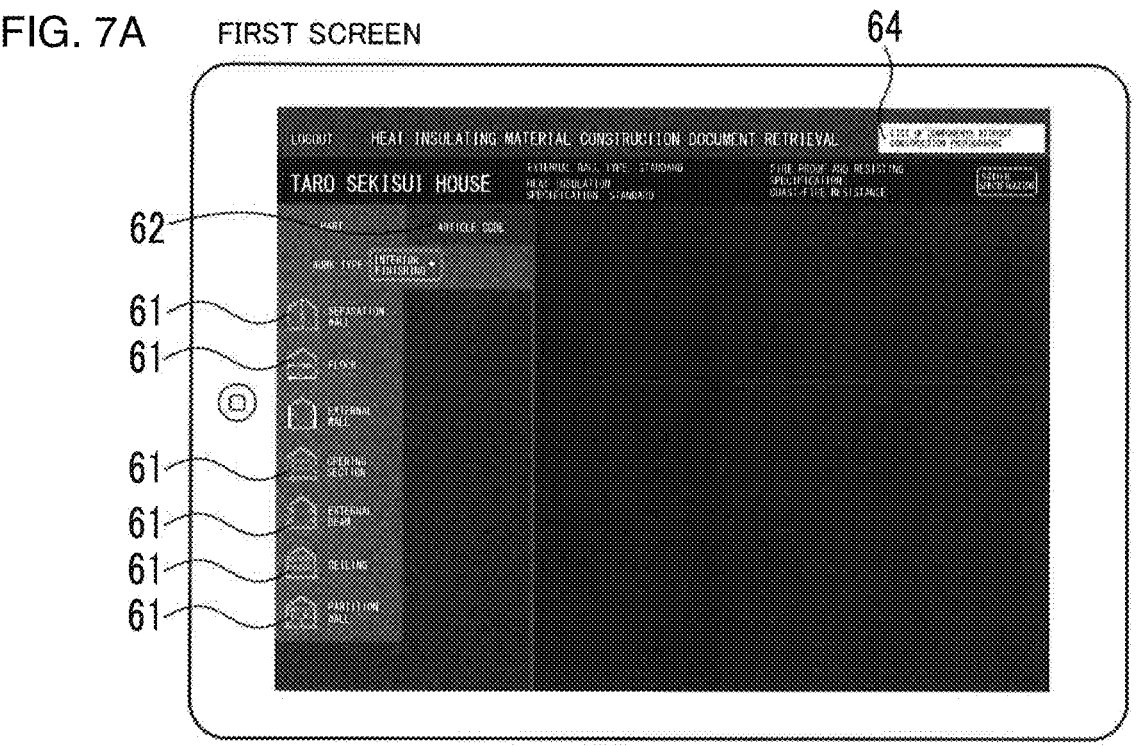
FIG. 7B  FIRST SCREEN
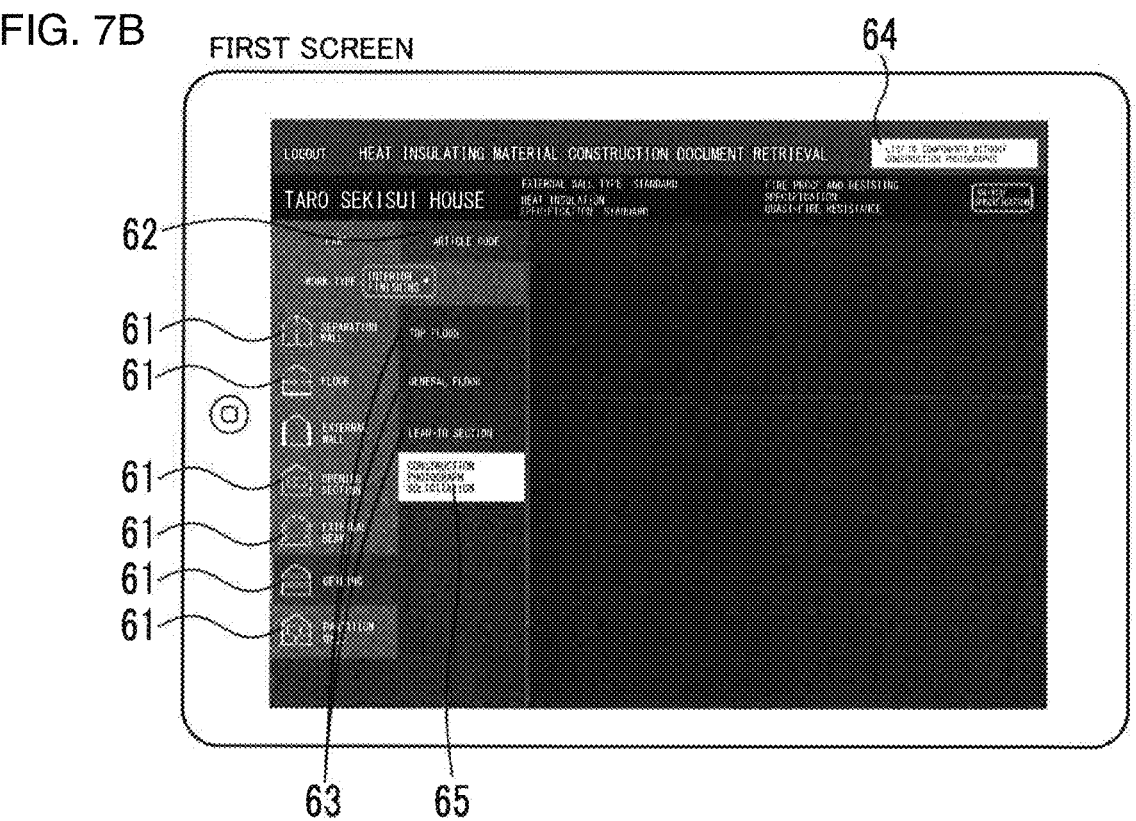

FIG. 8A  FIRST SCREEN
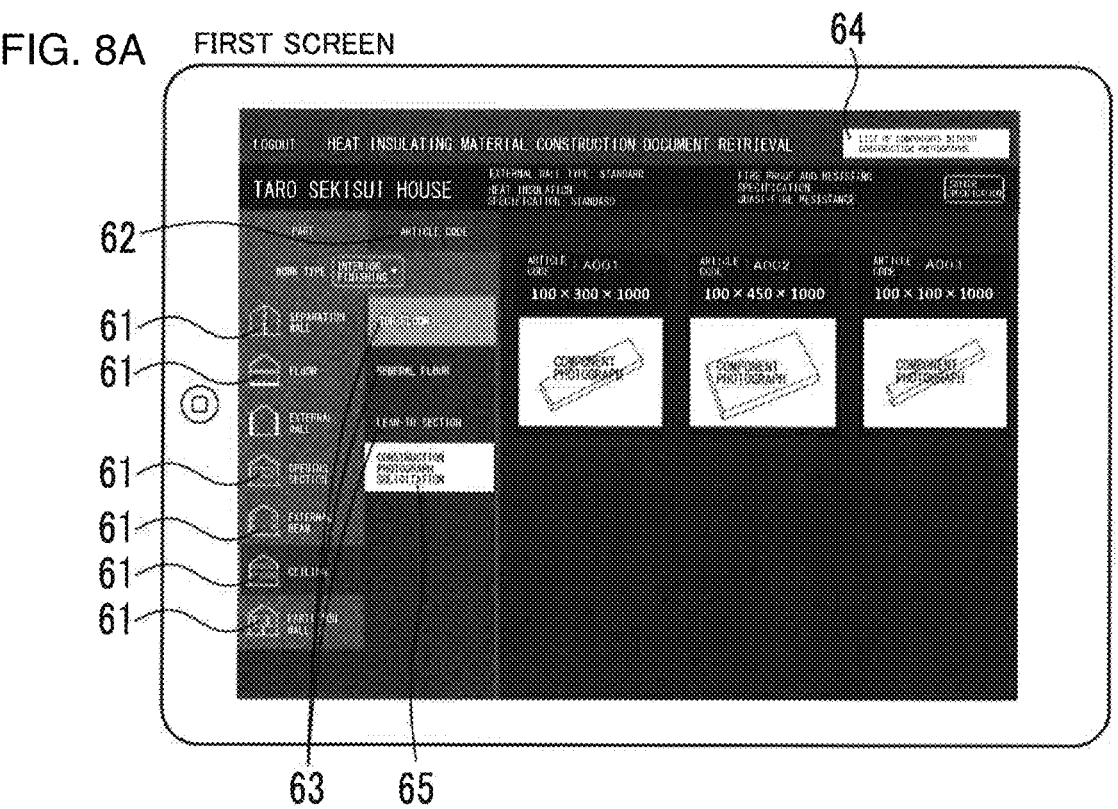
FIG. 8B  SECOND SCREEN
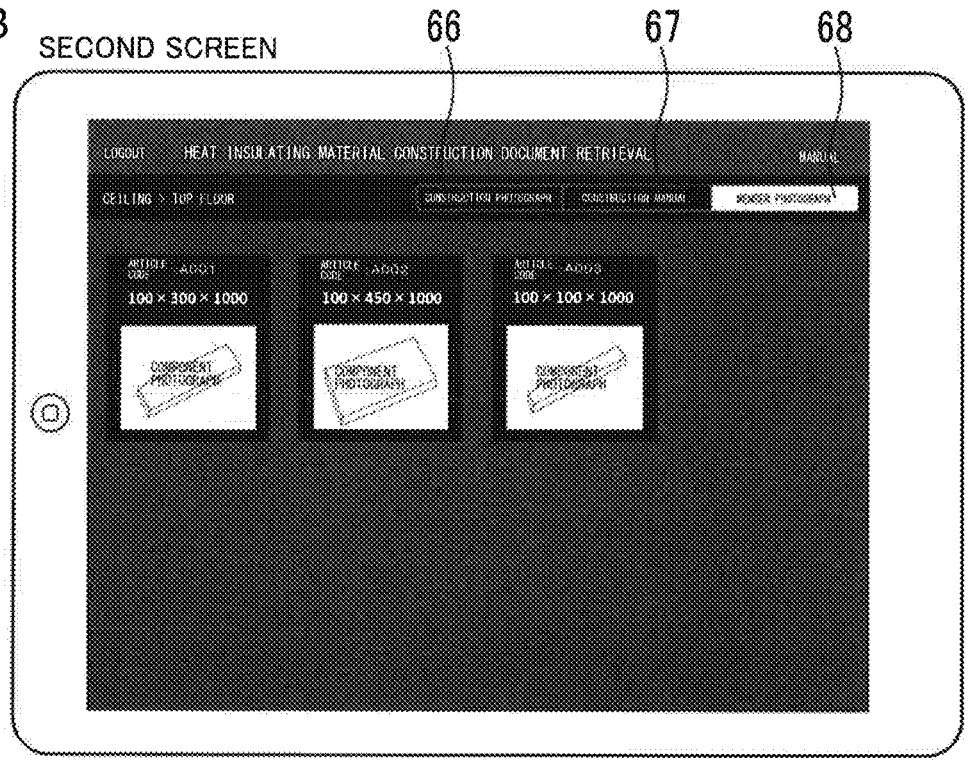

FIG. 9A THIRD SCREEN
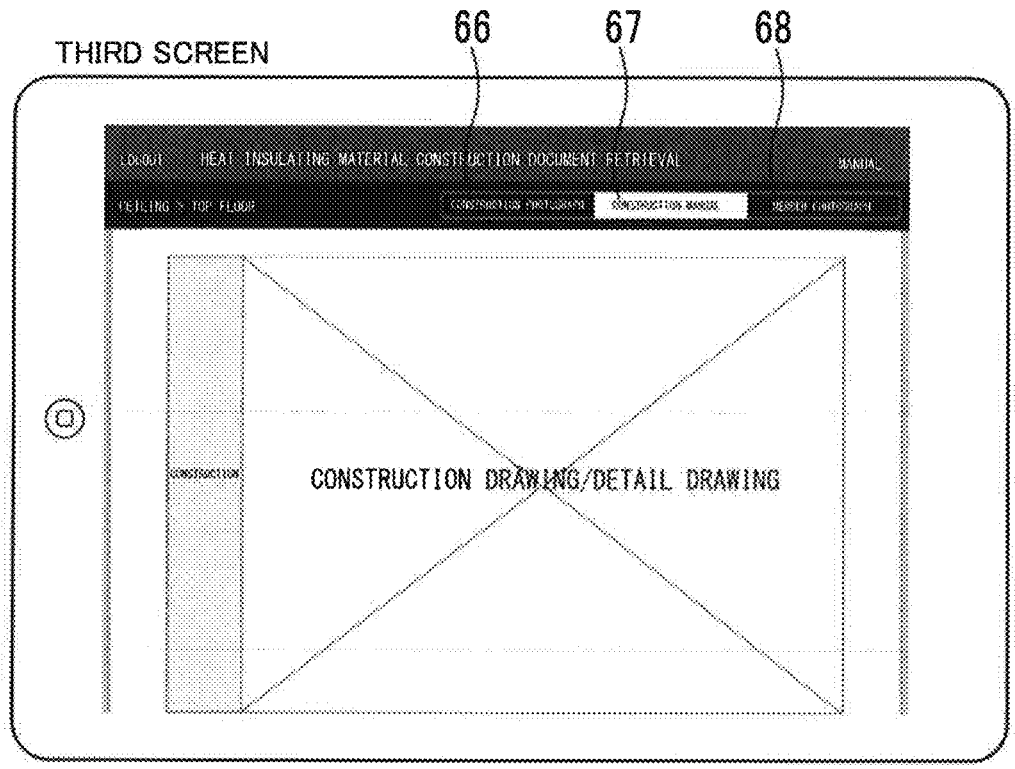
FIG. 9B FOURTH SCREEN
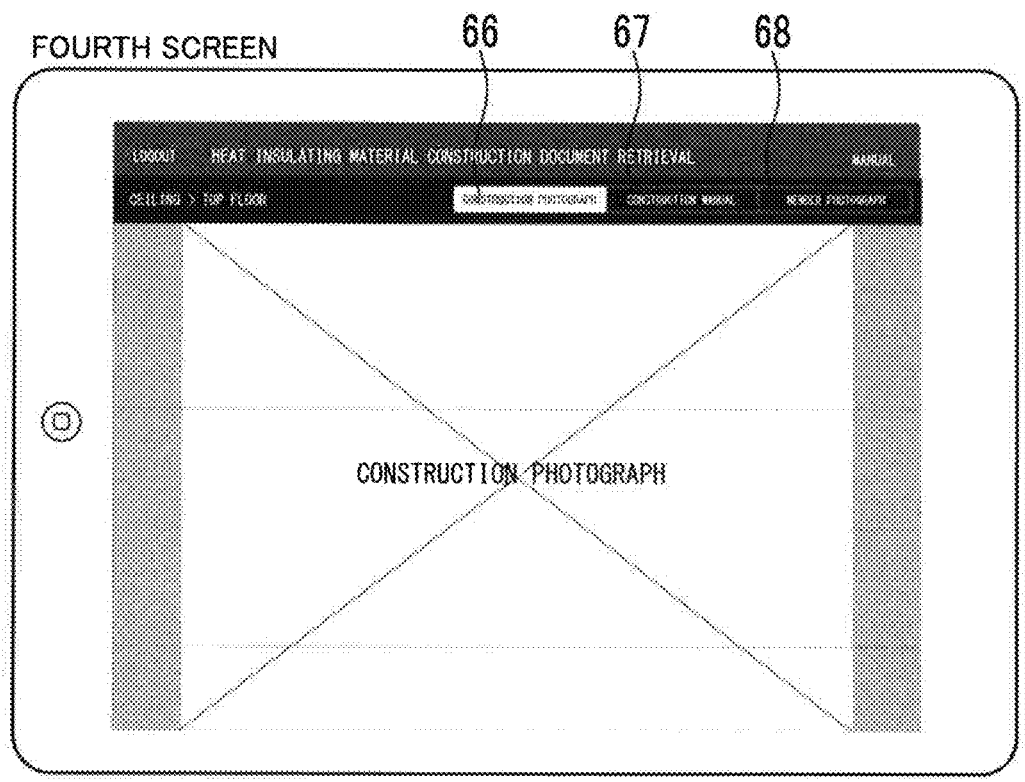

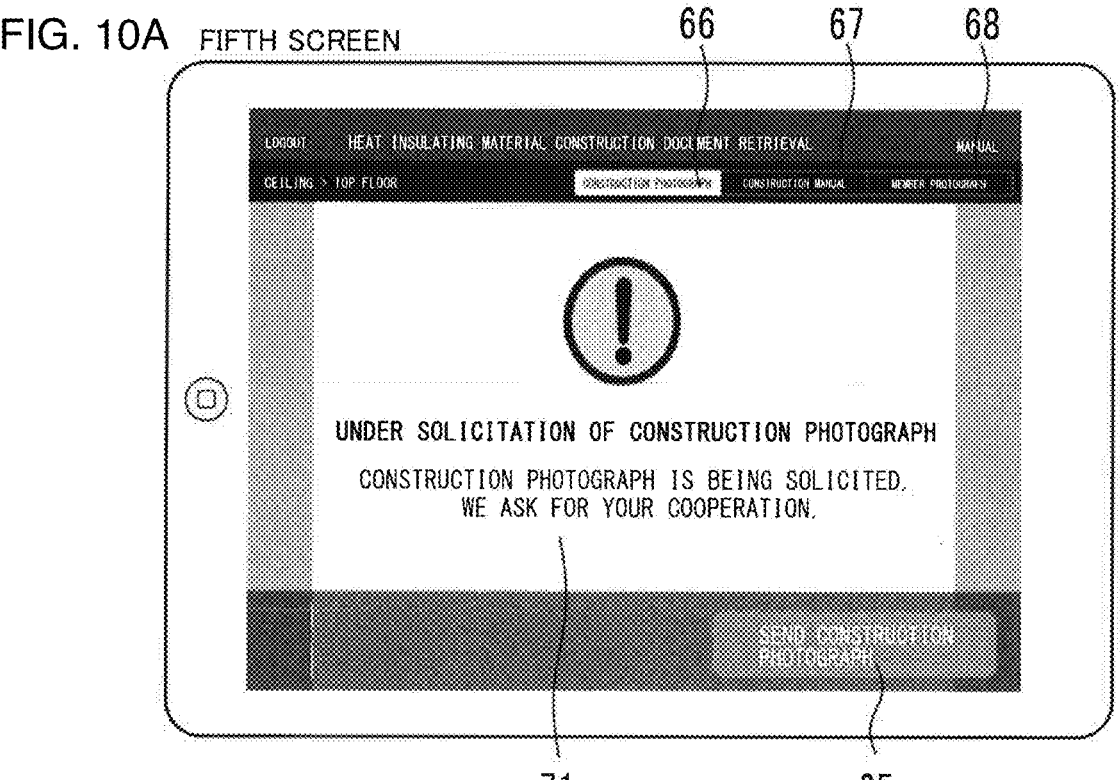
FIG. 10A FIFTH SCREEN
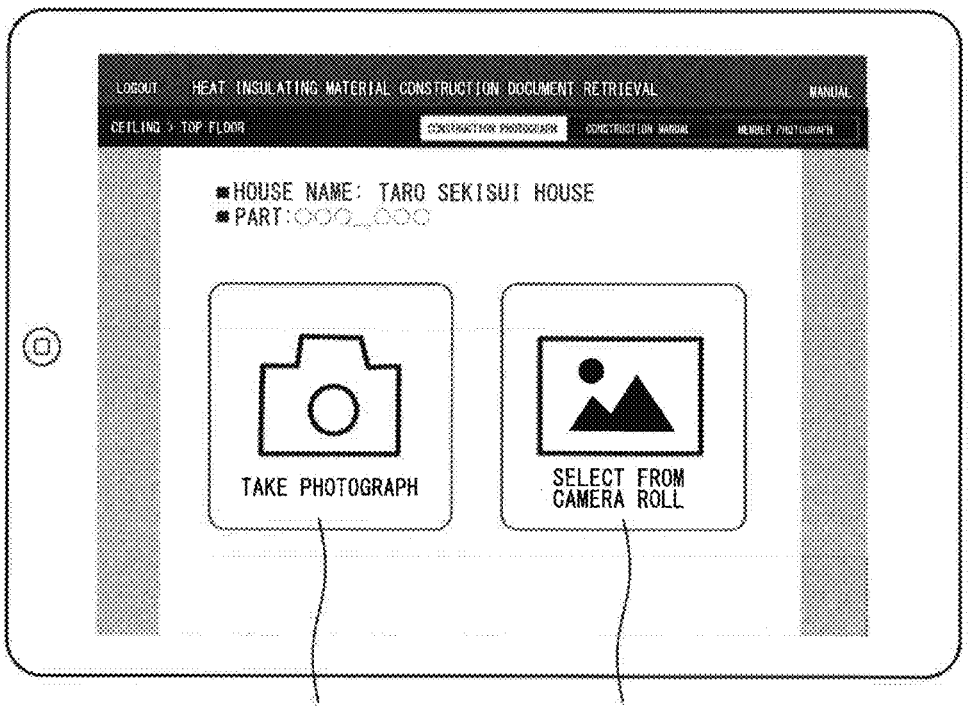
FIG. 10B SIXTH SCREEN

PROGRAM AND COMMUNICATIONS SYSTEM

BACKGROUND OF THE INVENTION

The present invention relates to technology of displaying construction information on a communication terminal device.

Patent Literature 1 discloses a house-by-house distribution system including a business main system server and a constructor PC. The business main system server reads member construction information from an HDD and sends the member construction information to the constructor PC, in response to a demand from the constructor PC. The member construction information includes manuals, construction procedures, reference construction drawings, collections of points, or the like.

CITATION LIST

Patent Literature

Patent Literature 1: Japanese Patent Application Laid-Open No. 2011-129016

SUMMARY OF THE INVENTION

By sending a photograph of a component after construction to the constructor PC in addition to a construction manual in response to a request from the constructor PC, construction mistakes can be reduced. However, it is difficult for an operator to go to a construction site and perform imaging the photograph of the component after construction.

The present invention has been made in view of the above-described circumstances. It is an object of the present invention to provide a means capable of easily acquiring the photograph of the component after construction.

(1) A program according to the present invention includes: a first program implemented on a communication terminal device having a display panel, an input interface, and a first communication interface connected to an Internet; and a second program implemented on a server having a second communication interface connected to the Internet. The first program executes: acceptance processing of accepting an input of information indicating a component, a house, or a customer through the input interface; and first sending processing of sending a first request to a communication address indicating the server through the first communication interface, the first request including specific information according to the information accepted by the acceptance processing and a return request of requesting a return of construction information.

The second program executes: acquisition processing of receiving the first request through the second communication interface, and acquiring the construction information associated with the specific information from a memory, based on a fact that the return request is included in the first request; determination processing of determining whether the construction information acquired by the acquisition processing includes a construction photograph; second sending processing of sending a first response having the construction information including the construction photograph through the second communication interface, based on determining that the construction photograph is included; and third sending processing of sending a second response having solicitation information and the construction information through the second communication interface, the solicitation information indicating that the construction photograph is solicited, based on determining that the construction photograph is not included. The first program executes: first display processing of displaying the construction information on the display panel, based on receiving the first response through the first communication interface; second display processing of displaying the construction information and information according to the solicitation information on the display panel, based on receiving the second response through the first communication interface; photograph data acquisition processing of acquiring photograph data, based on executing the second display processing; and fourth sending processing of sending a second request including the acquired photograph data to the communication address through the first communication interface. The second program executes: storing processing of storing, in the memory, the photograph data included in the received second request.

A worker who performs interior finishing of a building, such as bonding heat insulating materials, launches a program implemented on the communication terminal device possessed by the worker, and inputs information indicating the component, the house, or the customer, such as an article code, a house ID, or a customer ID. The communication terminal device sends the specific information according to the input information and the return request to the server. When receiving the return request, the server reads and acquires the construction information associated with the received specific information from the memory. When the acquired construction information includes the construction photograph, the server returns the acquired construction information including the construction photograph to the communication terminal device. The communication terminal device displays the received construction information on the display panel. In other words, the construction information including the construction photograph is displayed on the display panel of the communication terminal device. When the acquired construction information does not include the construction photograph, the server returns the solicitation information and the construction information not including the construction photograph to the communication terminal device. The communication terminal device displays information according to the received construction information and solicitation information on the display panel. In other words, the construction information such as construction manual and the solicitation information are displayed on the display panel of the communication terminal device. The worker performs construction in accordance with the construction information and performs imaging the component after construction. The communication terminal device sends, to the server, the photograph data generated by imaging. The server stores the received photograph data in the memory. The photograph data is stored as the construction photograph in the memory by an operator of the server, for example. Therefore, the program of the present invention enables easy acquisition of the photograph of the component after construction.

(2) The memory may associatedly store component information indicating the component, the construction information, and presence/absence information indicating presence or absence of the construction photograph. The determination processing is processing of determining whether the presence/absence information associated with the component information of the component indicated by the specific information indicates that the construction photograph is not included.

The presence/absence information is data of "0" or "1", for example. The second program can determine whether the construction photograph is included in the construction information, by determining whether the presence/absence information is "0" or "1". For example, when the specific information is the house ID indicating the house, a plurality of components is included in the house indicated by the house ID. Even when the specific information indicates the plurality of components in this manner, the second program can quickly determine whether the construction photograph is included in the construction information, by the presence/absence information.

(3) The second request may include a user ID indicating a worker, a constructor, or the communication terminal device. The storing processing is processing of associatedly storing the photograph data and the user ID in the memory.

Since the user ID is stored in association with the photograph data in the memory, the worker or the constructor who has sent the photograph data can be easily specified.

(4) The communication terminal device may further have an imaging device of performing imaging and outputting photograph data, and the photograph data acquisition processing includes: processing of accepting a launch input through the input interface; processing of launching an imaging program implemented on the communication terminal device using a sharing function provided by an OS implemented on the communication terminal device, based on accepting the launch input; and processing of acquiring the photograph data from the imaging program.

Since the first program launches the imaging program and acquires the photograph data from the imaging program, time and effort of the worker required for the first program to acquire the photograph data is reduced.

(5) The memory may associatedly store component information indicating the component, the construction information, and presence/absence information indicating presence or absence of the construction photograph, the third sending processing includes: processing of acquiring the component information associated with the presence/absence information indicating that the construction photograph is absent; and processing of sending the second response including, as the solicitation information, list information indicating a list of the acquired component information; and the second display processing includes: processing of displaying the list information on the display panel.

The worker can easily determine whether there is the construction photograph for the component to be constructed from now on, by visually recognizing the displayed list.

(6) A communication system according to the present invention includes: a communication terminal device having a display panel, an input interface, a first communication interface connected to an Internet, and a first controller; and a server having a second communication interface connected to the Internet and a second controller. The first controller executes: acceptance processing of accepting an input of information indicating a component, a house, or a customer through the input interface; and first sending processing of sending a first request to a communication address indicating the server through the first communication interface, the first request including specific information according to the information accepted by the acceptance processing and a return request of requesting a return of construction information. The second controller executes: acquisition processing of receiving the first request through the second communication interface, and acquiring the construction information associated with the specific information from a memory, based on a fact that the return request is included in the first request; determination processing of determining whether the construction information acquired by the acquisition processing includes a construction photograph; second sending processing of sending a first response having the construction information including the construction photograph through the second communication interface, based on determining that the construction photograph is included; and third sending processing of sending a second response having solicitation information and the construction information through the second communication interface, the solicitation information indicating that the construction photograph is solicited, based on determining that the construction photograph is not included. The first controller executes: first display processing of displaying the construction information on the display panel, based on receiving the first response through the first communication interface; second display processing of displaying the construction information and the solicitation information on the display panel, based on receiving the second response through the first communication interface; photograph data acquisition processing of acquiring photograph data showing the construction photograph, based on executing the second display processing; and fourth sending processing of sending a second request including the acquired photograph data to the communication address through the first communication interface. The second controller executes: storing processing of storing, in the memory, the photograph data included in the received second request.

The present invention can also be regarded as a communication system.

(7) A program according to the present invention is implemented on a communication terminal device having a display panel, an input interface, and a communication interface connected to an Internet. The program executes: acceptance processing of accepting an input of information indicating a component, a house, or a customer through the input interface; first sending processing of sending a first request to a communication address indicating the server through the communication interface, the first request including specific information according to the information accepted by the acceptance processing and a return request of requesting a return of construction information; first display processing of displaying the construction information on the display panel, based on receiving a first response through the communication interface, the first response being a response to the first request and having the construction information including a construction photograph; second display processing of displaying the construction information and solicitation information on the display panel, based on receiving a second response through the communication interface, the second response being a response to the first request and having the solicitation information and the construction information not including the construction photograph; photograph data acquisition processing of acquiring photograph data showing the construction photograph, based on executing the second display processing; and second sending processing of sending a second request including the acquired photograph data to the communication address through the communication interface.

The present invention can also be regarded as a program implemented on a communication terminal device.

(8) A program according to the present invention is implemented on a server having a communication interface connected to an Internet. The program executes: acquisition processing of acquiring, from a memory, construction information associated with specific information included in a first request, based on receiving the first request including a return request through the communication interface; determination processing of determining whether the construction information acquired by the acquisition processing includes a construction photograph; first sending processing of sending a first response having the construction information including the construction photograph through the communication interface, based on determining that the construction photograph is included; second sending processing of sending a second response having solicitation information and the construction information through the communication interface, the solicitation information indicating that the construction photograph is solicited, based on determining that the construction photograph is not included; receiving processing of receiving a second request including photograph data; and storing processing of storing, in the memory, the photograph data included in the received second request.

The present invention can also be regarded as a program implemented on a server.

(9) A program according to the present invention is implemented on a communication terminal device having a display panel, an input interface, and a communication interface connected to an Internet. The program executes: acceptance processing of accepting an input of information indicating a component, a house, or a customer through the input interface; first sending processing of sending a first request to a communication address indicating a server through the communication interface, the first request including specific information according to the information accepted by the acceptance processing and a return request of requesting a return of construction information; determination processing of determining whether the construction information includes a construction photograph, based on receiving a response through the communication interface, the response being a response to the first request and having the construction information; first display processing of displaying, on the display panel, the construction information including the construction photograph, based on determining that the construction information includes the construction photograph; second display processing of displaying, on the display panel, the construction information not including the construction photograph and solicitation information indicating that the construction photograph is solicited, based on determining that the construction information does not include the construction photograph; photograph data acquisition processing of acquiring photograph data, based on executing the second display processing; and second sending processing of sending a second request including the acquired photograph data to the communication address through the communication interface.

The worker who performs interior finishing of a building, such as bonding heat insulating materials, launches a program implemented on the communication terminal device possessed by the worker, and inputs information indicating the component, the house, or the customer, such as the article code, the house ID, and the customer ID. The communication terminal device sends the specific information according to the input information and the return request to the server. When receiving the return request, the server reads and acquires the construction information associated with the received specific information from the memory, and returns the acquired construction information to the communication terminal device. The communication terminal device displays the received construction information on the display panel. Then, the communication terminal device determines whether the construction photograph is included in the received construction information. When determining that the construction photograph is not included in the construction information, the communication terminal device displays, on the display panel, the solicitation information indicating that the construction photograph is solicited. The worker performs construction in accordance with the construction information and performs imaging the component after construction. The communication terminal device sends, to the server, the photograph data generated by imaging. Therefore, the program of the present invention enables the server to easily acquire the photograph of the component after construction.

The program and the communication system according to the present invention can provide a means capable of easily acquiring a photograph of a component after construction.

BRIEF DESCRIPTION OF DRAWINGS

FIG. 2 is a view illustrating a first database.

FIG. 3 is a view illustrating a second database.

FIG. 7 is a view FIGS. 7A and 7B are views illustrating first screens.

FIG. 8A is a view illustrating the first screen and FIG. 8B is a view illustrating a second screen.

FIG. 9A is a view illustrating a third screen and FIG. 9B is a view illustrating a fourth screen.

FIG. 10A is a view illustrating a fifth screen and FIG. 10B is a view illustrating a sixth screen.

DETAILED DESCRIPTION OF PREFERRED EMBODIMENTS OF THE INVENTION

Figure 1:
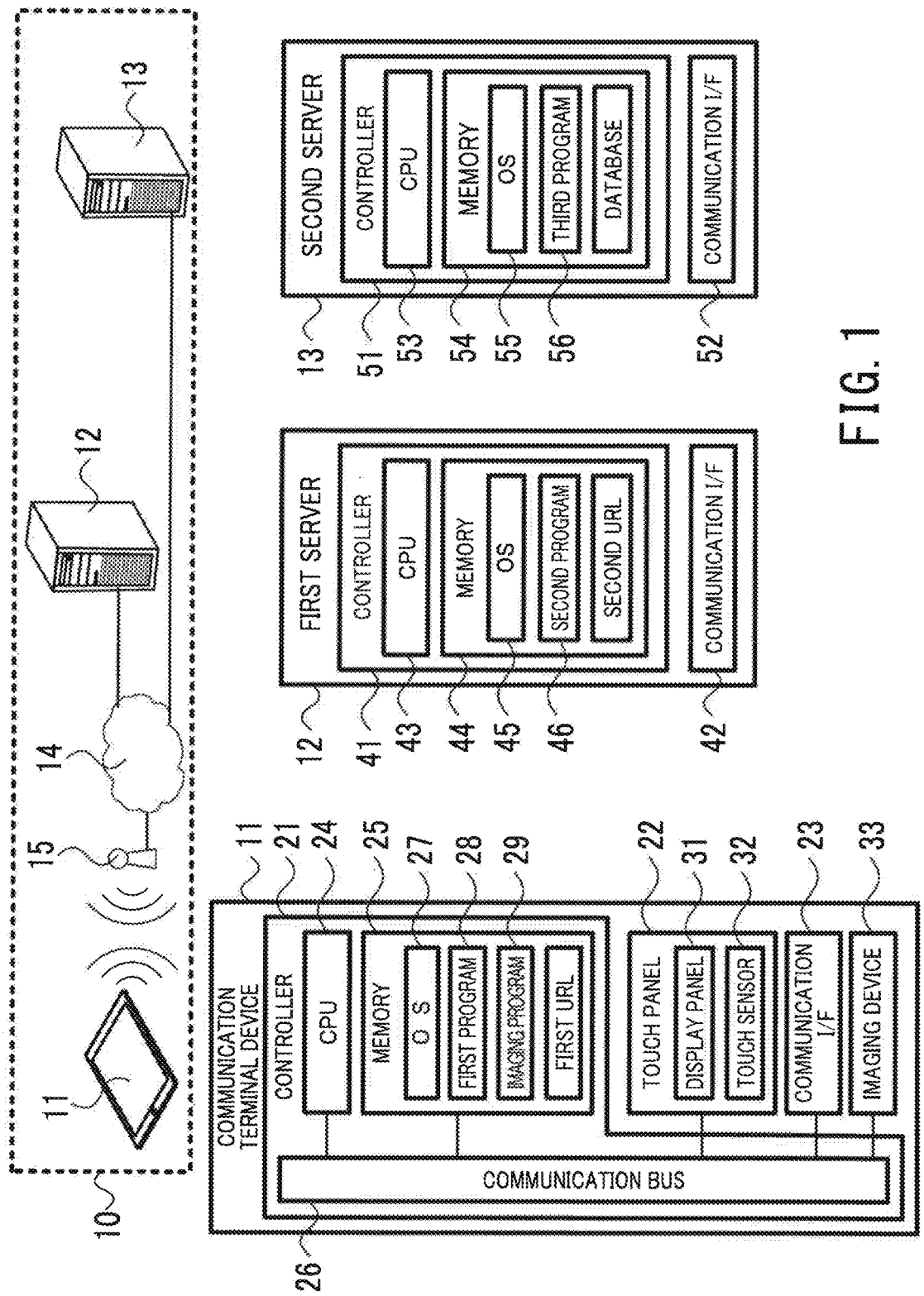
FIG. 1 is a diagram illustrating the configuration of a communication system 10.

Hereinafter, an embodiment of the present invention is described. It is a matter of course that the embodiment described below is merely an example of the present invention and the embodiment of the present invention can be altered as appropriate without altering the gist of the present invention.

This embodiment describes a communication system 10 providing construction information to a worker who performs interior finishing of a building, or the like. The construction information includes specifications, construction manuals, construction photographs, or the like of components. The worker performs work referring to the construction information. This embodiment mainly describes heat insulating materials for which the worker performs work referring to the construction photographs in many cases. However, components for which the worker performs the construction referring to the construction photographs are not limited to the heat insulating materials.

The communication system 10 includes a communication terminal device 11 used by the worker, a first server 12 providing the construction information to the communication terminal device 11, and a second server 13 having a memory 54 storing the construction information. The first server 12 and the second server 13 are examples of servers.

The communication terminal device 11 is a terminal device having a communication function and being portable, such as a smartphone, a tablet, or a notebook personal computer. The first server 12 is a so-called web server opening a first URL to public. The second server 13 is a management server managing drawings, components, and the construction information of buildings. In other words, the second server 13 is an existing server. When accepting a request from the communication terminal device 11, the first server 12 acquires the construction information from the second server 13 and sends the acquired construction information to the communication terminal device 11. Hereinafter, the configurations of the first server 12, the second server 13, and the communication terminal device 11 are described in detail.

The first server 12 includes a controller 41 and a communication I/F 42. The "I/F" is an abbreviation for "interface". The communication I/F 42 is an example of a second communication interface.

The controller 41 has a CPU 43 which is a central processing unit and a memory 44. The memory 44 has a storage area such as a hard disk, a storage area such as a RAM used for executing an OS 45 and a second program 46 described later, and other storage areas such as a buffer. The storage area such as the hard disk stores the OS 45, the second program 46, a second URL opened to the public by the second server 13, and the like.

The CPU 43, the memory 44, and the communication I/F 42 are mutually connected by a communication bus which is not illustrated. In other words, the OS 45 and the second program 46 executed by the CPU 43 can read information and data from the memory 44 or write information and data to the memory 44, and further can send and receive information and data through the communication I/F 42.

The OS 45 is an operating system and provides an API (abbreviation for Application Programming Interface) to other programs implemented on the first server 12. The second program 46 communicates with the second server 13 and the communication terminal device 11 using the API, for example.

The second program 46 is a program for accepting a request from the communication terminal device 11, communicating with the second server 13 in accordance with the accepted request, acquiring the construction information and the like from the second server 13, and returning the acquired construction information and the like to the communication terminal device 11. Processing executed by the second program 46 is described later.

The communication I/F 42 is connected to an Internet 14 by wired or wireless means. The communication I/F 42 communicates using a communication standard such as an Internet protocol. The first server 12 communicates with the communication terminal device 11 and the second server 13 through the communication I/F 42 and the Internet 14.

The second server 13 is a management server managing a first database which is a database in which components used for a building (house) are registered, and is also a web server opening the second URL to the public. Alternatively, the second server 13 may be a storage server managing the first database.

The second server 13 includes a controller 51 and a communication I/F 52. The configuration of the communication I/F 52 is similar to the configuration of the communication I/F 42. The communication I/F 52 is connected to a CAD terminal device and an operator terminal device which are not illustrated, via a communication line such as a wired LAN, a wireless LAN, or the Internet. Information such as drawings drawn by a designer using the CAD terminal device and a later-described article code input to the CAD terminal device is input to the second server 13 through the communication I/F 52 and is registered in the first database. The controller 41 of the first server 12 and the controller 51 of the second server 13 are examples of second controllers.

A CPU 53, the memory 54, and the communication I/F 52 are mutually connected by a communication bus which is not illustrated. In other words, a later-described third program 56 executed by the CPU 53 can read information and data from the memory 54 or write information and data to the memory 54, and further can send and receive information and data through the communication I/F 52.

The controller 51 has the CPU 53 which is a central processing unit and the memory 54. The configuration of the memory 54 is similar to that of the memory 44. The memory 54 stores an OS 55 which is an operating system, the third program 56, the first database, and a second database. The second program 46 and the third program 56 described above are examples of second programs.

The third program 56 is a program for registering a house ID, the article code, a construction photograph, and the like described later in the first database and returning the construction information and the like registered in the first database to the first server 12 in response to a request from the first server 12. Processing executed by the third program 56 is described later.

The first database is a database managing the components of the building. The first database has a plurality of columns (columns) and a plurality of records (rows) as illustrated in FIG. 2(A). The plurality of columns has, as names, item names such as an item name "HOUSE ID", an item name "HOUSE NAME", an item name "LARGE PART", an item name "SMALL PART", an item name "TYPE", an item name "ARTICLE NAME", an item name "ARTICLE CODE", an item name "SPECIFICATION INFORMATION", an item name "CONSTRUCTION MANUAL", an item name "PRESENCE/ABSENCE INFORMATION", and an item name "CONSTRUCTION PHOTOGRAPH". In other words, the first database is a database associating the house ID, a house name, a large part, a small part, a type, an article name, the article code, specification information, the construction manual, presence/absence information, the construction photograph, and the like. The first database may further have a column (column) provided with another item name, such as "DRAWING".

In each field corresponding to the item name "HOUSE ID", the house ID which is identification information for individually identifying buildings (houses) is registered. The house ID registered in the field is text data indicating characters or numbers, for example. The house ID is registered in the first database by the third program 56 based on the fact that the building has been designed. The third program 56 registers, in the first database, the house ID input by the designer in the CAD terminal device or the house ID generated by the third program 56, for example.

In each field corresponding to the item name "HOUSE NAME", the name of a customer who has ordered the house is registered as the house name. In the example illustrated in the drawing, the name of the house name "TARO SEKISUI" is registered for the house ID "ABC".

In each field corresponding to the item name "LARGE PART", text data indicating characters indicating each section of the building such as "SEPARATION WALL", "PARTITION WALL", "EXTERNAL WALL", "FLOOR", or "OPENING SECTION" is registered. The large part is registered in the first database by the third program 56 based on the fact that the building has been designed. The third program 56 registers, in the first database, the large part input or selected by the designer in the CAD terminal device, for example.

In each field corresponding to the item name "SMALL PART", text data indicating characters such as "TOP FLOOR", "GENERAL FLOOR", or "LEAN-TO SECTION" indicating subdivided parts belonging to each large part is registered. The small part is registered in the first database by the third program 56 as with the large part.

In each field respectively corresponding to the item name "TYPE", the item name "ARTICLE NAME", and the item name "ARTICLE CODE", the type of each component belonging to the small part, the name of each component, and the article code respectively identifying each component are registered, respectively. In each field corresponding to the item name "TYPE", text data indicating "HEAT INSULATING MATERIAL", "BASE MATERIAL", "FINISHING MATERIAL", or the like is registered, for example. In each field corresponding to the item name "ARTICLE NAME", text data indicating the name of the component such as "HEAT INSULATING MATERIAL A" or "HEAT INSULATING MATERIAL D" is registered. In each field corresponding to the item name "ARTICLE CODE", text data indicating a code assigned to each component such as "A001" or "A012" is registered. The type, the article name, and the article code are registered in the first database by the third program 56 as with the large part and the small part. The type, the article name, and the article code are examples of component information.

In each field corresponding to the item name "SPECIFICATION INFORMATION", a specification file including component photograph data showing a photograph of a component, or the like is registered. For example, when the component is the heat insulating material, the specification file includes data such as component photograph data showing a photograph of the heat insulating material. A file path indicating the specification file may be registered in the first database. The construction manual, the construction photograph data, and the like registered in other fields may be file paths similarly.

In each field corresponding to the item name "CONSTRUCTION MANUAL", a construction manual having a file form and being a manual to which the worker refers in constructing the component is registered. The construction manual includes text data indicating characters describing a construction method, image data showing a picture or a photograph, or the like. The construction manual is input to the second server 13 through the operator terminal device, for example. The third program 56 registers the input construction manual in the first database.

In each field corresponding to the item name "CONSTRUCTION PHOTOGRAPH", construction photograph data is registered, the construction photograph data showing a construction photograph which is a photograph of a component after the component is constructed. The third program 56 registers image data designated by an operator in the operator terminal device, as the construction photograph data in the first database. Processing in which the third program 56 registers the construction photograph data in the first database is described later. The specification information, the construction manual, and the construction photograph registered in the first database are examples of construction information.

In each field corresponding to the item name "PRESENCE/ABSENCE INFORMATION", information indicating presence or absence of the construction photograph data is registered. In the example illustrated in the drawing, the presence/absence information is "1" indicating that the construction photograph data is present or "0" indicating that the construction photograph data is absent. The presence/absence information is used for processing in which the third program 56 determines whether there is the construction photograph. A detailed description is given later.

The second database illustrated in FIG. 3 is a database for classifying and managing photograph data posted by workers. The second database has a plurality of columns (columns) and a plurality of records (rows). The plurality of columns is provided, as names, with the item name "ARTICLE CODE", the item name "USER ID", an item name "EMAIL ADDRESS", an item name "PHOTOGRAPH DATA", and the like.

In each field corresponding to the item name "ARTICLE CODE", the article code which is identification information for individually identifying components is registered as with the first database.

In each field corresponding to the item name "USER ID", a user ID is registered. The user ID is identification information for individually identifying the workers, identification information for individually identifying constructors, terminal identification information for individually identifying the communication terminal devices 11, or the like. The terminal identification information is an IP address, a MAC address, or the like assigned to the terminal device, for example. The user ID is input from the first server 12 together with the photograph data. The third program 56 registers the input user ID in the second database. A detailed description is given later.

In each field corresponding to the item name "EMAIL ADDRESS", an email address of the worker, the constructor, or the like indicated by the user ID is registered. The email address is notified to the second server 13 by the worker or the constructor indicated by the user ID and is registered in the second database in association with the user ID. The email address is used for sending an adoption notification email to the worker or the constructor who has submitted the photograph data that has been adopted as the construction photograph. A detailed description is given later.

In each field corresponding to the item name "PHOTOGRAPH DATA", photograph data posted by the worker is registered. The third program 56 registers, in the second database, the photograph data input from the first server 12 in association with the user ID. A detailed description is given later.

As illustrated in FIG. 1, the communication terminal device 11 includes a controller 21, a touch panel 22, a communication I/F 23, and an imaging device 33. The controller 21 is an example of a first controller. The communication I/F 23 is an example of a first communication interface.

The touch panel 22 has a display panel 31 and a touch sensor 32 overlapped on the display panel 31. The touch sensor has a transparent plate shape and outputs position information according to the position touched by a user with a finger or the like. The touch sensor 32 is an example of an input interface.

The communication I/F 23 is an interface for communicating in compliance with a wireless communication standard such as Wi-Fi. A radio signal sent by the communication I/F 23 is received by an access point 15 of a LAN connected to the Internet 14. Further, the communication I/F 23 receives a radio signal sent by the access point 15. The communication terminal device 11 communicates with the first server 12 through the communication I/F 23, the access point 15, and the Internet 14. The LAN provided with the access point 15 is connected to the Internet 14 via a router forming a firewall. The communication terminal device 11 communicates with the first server 12 beyond the firewall formed by the router, by sending an HTTP request and receiving an HTTP response returned to the sent HTTP request.

The imaging device 33 includes a lens and an imaging element converting light collected by the lens to a voltage. The imaging device 33 generates photograph data by imaging and outputs the generated photograph data. The photograph data output by the imaging device 33 is stored in a photograph folder formed in a memory 25, for example.

The controller 21 has a CPU 24 which is a central processing unit, the memory 25, and a communication bus 26. The communication bus 26 mutually connects the CPU 24, the memory 25, the touch panel 22, and the communication I/F 23. In other words, a later-described first program 28 executed by the CPU 24 can store information and data in the memory 25, read information and data from the memory 25, input information and data to the display panel 31 to display a screen on the display panel 31, accept the position information output by the touch sensor 32, and send and receive information and data through the communication I/F 23.

The memory 25 stores an OS 27 which is an operating system, the first program 28, an imaging program 29, and the first URL opened to the public by the first server 12. The first program 28 and the above-described second program 46 and third program 56 are examples of programs. The first URL is an example of a communication address.

The imaging program 29 is a program for performing processing of making the imaging device 33 execute imaging and generate the photograph data. For the imaging program 29, an existing application program is used, for example.

The OS 27 is an operating system and provides an API to other programs implemented on the communication terminal device 11, as with the above-described OS 45 in the first server 12. Further, the OS 27 has a sharing function. The sharing function has a function that one program implemented on the communication terminal device 11 launches another program implemented on the communication terminal device 11. Specifically, the first program 28 launches the imaging program 29 using the sharing function of the OS 27. The launched imaging program 29 makes the imaging device 33 perform imaging and generate the photograph data. The imaging program 29 passes the photograph data generated by the imaging device 33 to the first program 28. In other words, the first program 28 acquires the photograph data using the sharing function of the OS 27. A detailed description is given later.

The first program 28 is a so-called application program. The first program 28 consists of a plurality of programs such as a UI module accepting an input from the worker, a communication module communicating with the first server 12, and a main module making the UI module and the first server 12 execute processing. However, the first program 28 may be a single program.

Alternatively, the first program 28 may be a so-called plug-in program for extending functions of a browser implemented on the communication terminal device 11 or may be HTML data having a script instructing to the browser. Hereinafter, an example is described in which the first program 28 is an application program.

The first program 28 executes processing of accepting an input by the worker through the touch sensor 32, requesting the construction information to the first server 12, and receiving the construction information sent by the first server 12 to display the construction information on the display panel 31. Further, the first program 28 executes processing of acquiring the photograph data and sending the acquired photograph data to the first server 12. Hereinafter, processing executed by the first program 28 of the communication terminal device 11, the second program 46 of the first server 12, and the third program 56 of the second server 13 are described in detail.

Figure 4:
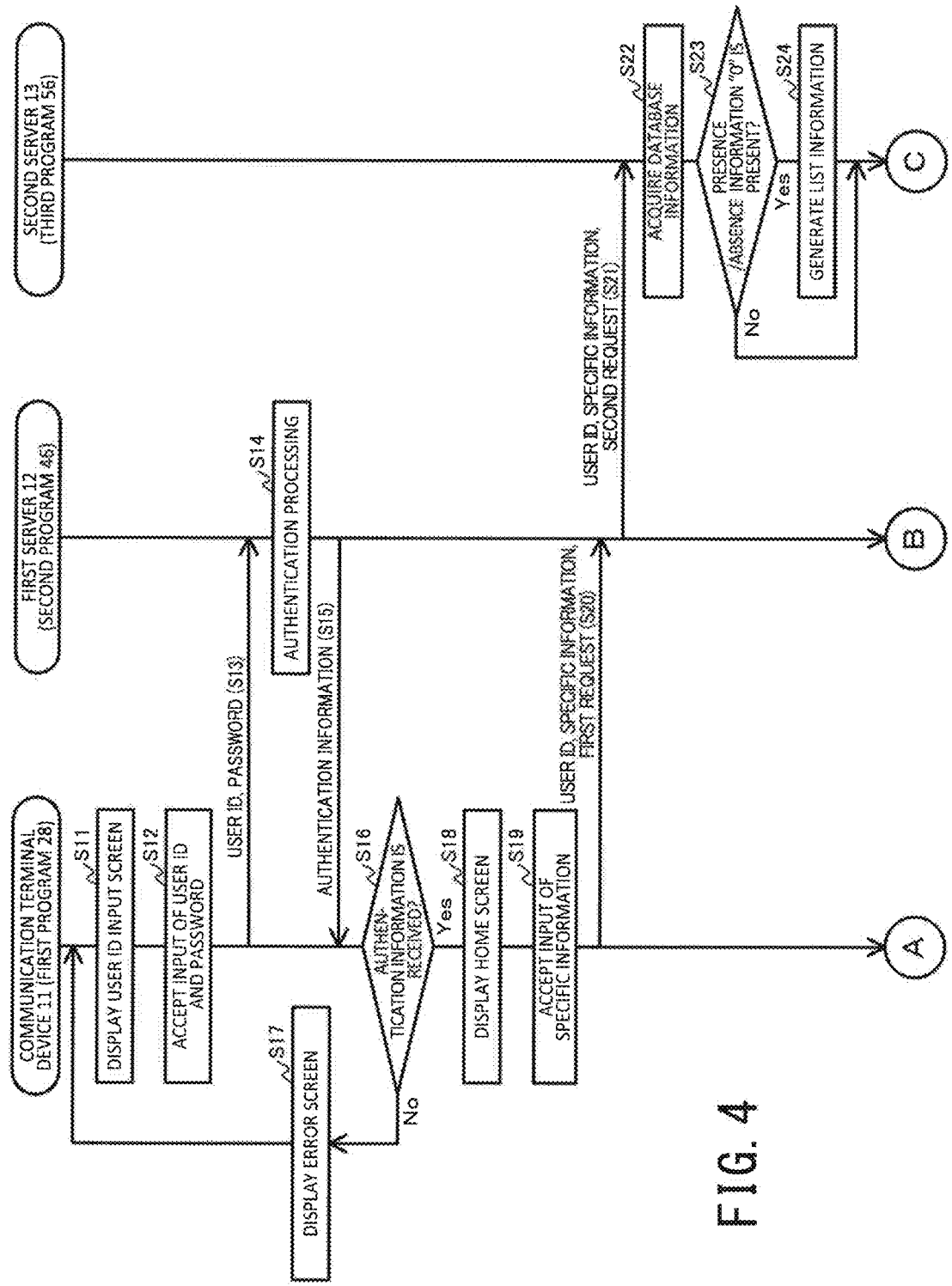
FIG. 4 is a view illustrating a part of processing of a first program 28, a second program 46, and a third program 56.

A worker who constructs a building operates the touch panel 22 of the communication terminal device 11 and launches the first program 28. As illustrated in FIG. 4, the launched first program 28 displays a user ID input screen which is not illustrated, on the display panel 31 (S11). The user ID input screen has a software keyboard, a text box in which the user ID is input, and a text box in which a password is input, for example. The worker touches the displayed software keyboard and inputs the user ID and the password.

The first program 28 accepts the input of the user ID and the password through the touch sensor 32 (S12). The first program 28 generates an HTTP request including the accepted user ID and password, and sends the generated HTTP request to the first URL stored in the memory 25 through the communication I/F 23 (S13). In the following description, sending and receiving a request or a response through the communication I/F 23, the communication I/F 42, the communication I/F 52, the Internet 14, or the like is simply described as "sending or receiving a request or a response".

The second program 46 of the first server 12 executes authentication processing (S14) based on receiving the HTTP request sent by the communication terminal device 11 (S13). Specifically, the second program 46 specifies, in the memory 44, the password corresponding to the user ID included in the received HTTP request, and determines whether the specified password matches the password included in the HTTP request. The memory 44 stores in advance a table in which the user ID and the password are associated.

The second program 46 sends an HTTP response including authentication information to the communication terminal device 11, based on the fact that the password specified in the memory 44 matches the password included in the HTTP request (S15). The authentication information is a PIN indicating that it has been authenticated, for example.

Although not illustrated in the flowchart, the second program 46 returns an HTTP response including error information to the communication terminal device 11, based on the fact that the password specified in the memory 44 does not match the password included in the HTTP request.

The first program 28 of the communication terminal device 11 determines whether the authentication information is included in the received HTTP response (S16), based on receiving the HTTP response (S15). When determining that the authentication information is included in the received HTTP response (S16: No), the first program 28 displays an error screen on the display panel 31 (S17), and then executes the processing in and after step S11 again.

When determining that the authentication information is included in the received HTTP response (S16: Yes), the first program 28 displays a home screen which is not illustrated, on the display panel 31 (S18). The first program 28 may display the home screen on the display panel 31 via one or more screens.

The home screen includes, for example, a text box for accepting an input of the house ID, a text box or a pull-down menu for accepting an input or a selection of the type of the component, a text box or a pull-down menu for accepting an input or a selection of the article name which is the name of the component, a text box for accepting an input of the article code, and a software keyboard. The worker touches the displayed software keyboard and inputs, to the communication terminal device 11, specific information such as the house ID, the type, the article name, the article code, or a customer ID.

The first program 28 of the communication terminal device 11 accepts the input of the specific information (S19) and acquires the specific information. Step S19 is an example of acceptance processing.

The first program 28 of the communication terminal device 11 generates an HTTP request including the acquired specific information, the user ID acquired in step S12, and a first request, and sends the generated HTTP request to the first server 12 (S20). The first request is a request indicating that database information according to the specific information is to be returned and is a command interpretable by the second program 46 of the first server 12, for example. The database information is information registered in the above-described first database. The first program 28 may add, to the HTTP request, the PIN included in the authentication information acquired in step S15, in place of the user ID. The first request is an example of a return request. Step S20 is an example of first sending processing. The HTTP request sent in step S20 is an example of a first request.

Based on receiving the HTTP request sent by the communication terminal device 11 (S20), the second program 46 of the first server 12 generates an HTTP request including the user ID and the specific information included in the received HTTP request and a second request, and sends the generated request to the second server 13 (S21). The second request is a request indicating that the database information according to the specific information is to be returned and is a command interpretable by the third program 56 of the second server 13, for example. The memory 54 of the first server 12 stores in advance a table in which a command indicating the received first request and a command interpretable by the third program 56 are associated. The second program 46 can acquire the database information from the second server 13 which is an existing server, by generating the request including the second request. In other words, the third program 56 of the second server 13 can be utilized without changing a specification.

Based on receiving the request sent by the first server 12 (S21), the third program 56 of the second server 13 acquires the database information from the first database using the specific information included in the received request (S22). Explaining in detail, the third program 56 specifies, in the first database, one or more records having the house ID, the type, the article name, the article code, and the like matching the house ID, the type, the article name, the article code, and the like included in the specific information. The third program 56 respectively reads information respectively registered in each field of the specified record in association with the item name and acquires the information as the database information. The processing in step S22 is an example of acquisition processing.

Next, the third program 56 of the second server 13 determines whether there is a component with the presence/absence information of "0" for the acquired database information (S23). In other words, in step S23, it is determined whether there is a component for which the construction photograph is not registered. The processing in step S23 is an example of determination processing.

When determining that there is the component with the presence/absence information of "0" (S23: Yes), the third program 56 of the second server 13 generates list information showing a list of the components for which no construction photographs are registered (S24). Specifically, the third program 56 further specifies a record with the presence/absence information of "0" based on the acquired database information, reads the large part, the small part, the type, the article name, the article code and the like of the specified record, and generates the list information using the read article code and the like. When determining that all the presence/absence information is "1" for the acquired database (S23: No), the third program 56 skips the processing in step S24. In other words, when there are no components for which the construction photographs are not registered, the list information is not generated. The list information is an example of solicitation information.

Figure 5:
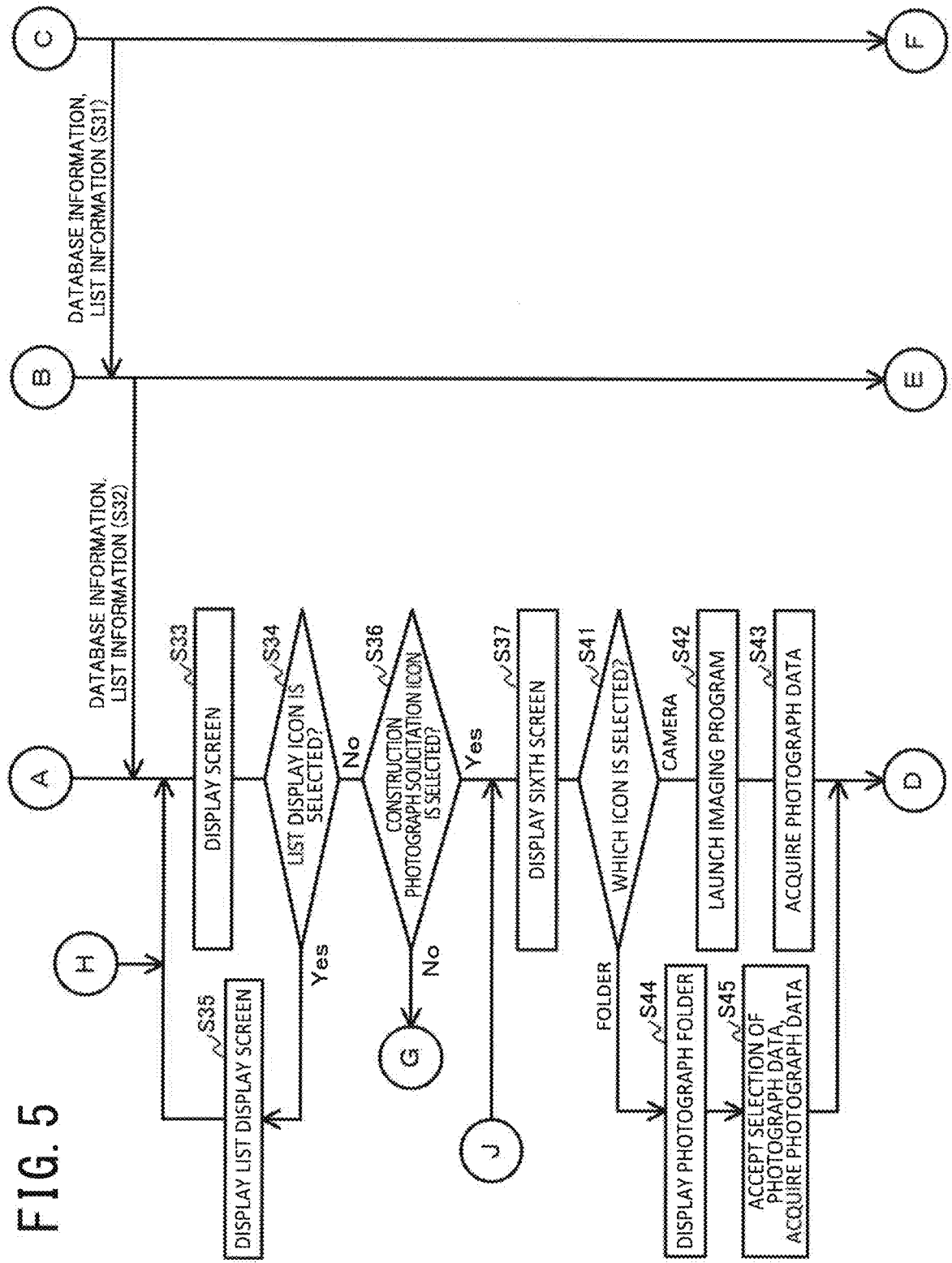
FIG. 5 is a view illustrating the continuation of the processing of FIG. 4.

As illustrated in FIG. 5, the third program 56 of the second server 13 generates a response including the acquired database information and list information, and returns the generated response to the first server 12 (S31). When the construction photographs are registered for all the components included in the database information, the response returned by the second server 13 does not include the list information.

Based on receiving the response sent by the second server 13 (S31), the first server 12 generates an HTTP response including the database information and the list information included in the received response, and returns the generated HTTP response to the communication terminal device 11 (S32). When the construction photographs are registered for all the components included in the database information, the HTTP response returned by the first server 12 does not include the list information. The HTTP response returned by the first server 12 and not including the list information is an example of a first response. The HTTP response returned by the first server 12 and including the list information is an example of a second response. Step S32 of returning the HTTP response not including the list information is an example of first sending processing and second sending processing. Step S32 of returning the HTTP response including the list information is an example of second sending processing and third sending processing.

When receiving the HTTP response sent by the first server 12 (S32), the first program 28 of the communication terminal device 11 displays screens illustrated in FIGS. 7 to 11 on the display panel 31 based on the database information and the list information included in the received HTTP response (S33). Specifically, the first program 28 includes a plurality pieces of original screen data for generating the screens. The original screen data has a class for accepting an input of the database information. The first program 28 inputs the database information to the class and generates screen data as an instance. The first program 28 inputs the generated screen data to the display panel 31 and displays the screens illustrated in FIGS. 7 to 11 on the display panel 31.

The screens illustrated in FIGS. 7 to 11 are described in detail. When the specific information input to the communication terminal device 11 by the worker in step S19 is the house ID, a first screen illustrated in FIG. 7A is displayed on the display panel 31. The first screen has characters indicating the house name, one or more large part icons 61 indicating the large parts included in the house, and an article code icon 62 for accepting an input of the article code. Further, when the list information is included in the HTTP response received by the communication terminal device 11 in step S32, the first screen further has a list display icon 64. The list display icon 64 is an icon for accepting an instruction of displaying the list of the components for which the construction photographs are not registered. When the list information is not included in the HTTP response received by the communication terminal device 11 in step S32, the first screen does not have the list display icon 64. FIG. 7B illustrates a case where the first screen has the list display icon 64.

When the worker selects the large part icon 61 on the first screen, the first program 28 of the communication terminal device 11 displays small part icons 63 indicating small parts belonging to the large part indicated by the selected large part icon 61, on the first screen as illustrated in FIG. 7B.

When the worker selects the small part icon 63 on the first screen, the first program 28 of the communication terminal device 11 displays the article codes, the component photographs, and the like of the components belonging to the selected small part icon 63, on the first screen as illustrated in FIG. 8A. In the example illustrated in FIG. 8A, limited to the heat insulating material, the article codes and the component photographs of the heat insulating materials belonging to the small part indicated by the selected small part icon 63 are displayed.

The first program 28 of the communication terminal device 11 determines whether there is a component without a construction photograph among the components belonging to the selected small part icon 63, based on the fact that the small part icon 63 is selected. When determining that there is the component without the construction photograph among the components belonging to the selected small part icons 63, the first program 28 displays a construction photograph solicitation icon 65 on the first screen. When determining that there is no component without the construction photograph, the first program 28 does not display the construction photograph solicitation icon 65 on the first screen. In the example illustrated in FIG. 8A, the construction photograph solicitation icon 65 is displayed on the first screen. When the component without the construction photograph is included in the house designated by the worker or is included in the large part or the small part designated by the worker, the first program 28 may display the construction photograph solicitation icon 65 on the first screens illustrated in FIG. 7A and FIG. 7B. The processing in step S33 in which the first program 28 displays the first screen without the construction photograph solicitation icon 65 on the display panel 31 is an example of first display processing. The processing in step S33 in which the first program 28 displays the first screen with the construction photograph solicitation icon 65 on the display panel 31 is an example of second display processing. The construction photograph solicitation icon 65 is an example of solicitation information and information according to solicitation information.

When the worker selects the article code icon 62 on the first screen, the first program 28 of the communication terminal device 11 displays a text box for accepting an input of the article code and a software keyboard on the first screen. The worker inputs the article code to the text box using the displayed software keyboard. The first program 28 acquires, from the database information acquired in step S24, the construction photograph, the specification information, the construction manual, or the like of the component according to the input article code, and displays a second screen with the acquired construction photograph, specification information, construction manual, or the like, on the display panel 31 as illustrated in FIG. 8B The second screen has a construction photograph icon 66 for accepting an instruction of displaying the construction photograph, a construction manual icon 67 for accepting an instruction of displaying the construction manual, and a component photograph icon 68 for accepting an instruction of displaying the component photograph. Also, when the specific information input by the worker in step S19 is the article code, the first program 28 similarly displays the second screen on the display panel 31.

Based on the fact that the construction manual icon 67 is selected, the first program 28 displays a third screen with the construction manual on the display panel 31 as illustrated in FIG. 9A. Based on the fact that the component photograph icon 68 is selected, the first program 28 displays the above-described second screen with the component photographs on the display panel 31 as illustrated in FIG. 8B.

The first program 28 determines whether there is a construction photograph corresponding to the article code input by the worker, and based on determining that there is the construction photograph and the fact that the construction photograph icon 66 is selected, displays a fourth screen with the construction photograph on the display panel 31 as illustrated in FIG. 9B. Based on determining that there is no construction photograph and the fact that the construction photograph icon 66 is selected, the first program 28 displays a fifth screen illustrated in FIG. 10A on the display panel 31. The fifth screen has an attention object 71 including characters of "UNDER SOLICITATION OF CONSTRUCTION PHOTOGRAPH" and the construction photograph solicitation icon 65 for accepting the solicitation of the construction photograph.

As illustrated in FIG. 5, the first program 28 of the communication terminal device 11 determines whether the list display icon 64 is selected on the first screen (S34). When determining that the list display icon 64 is selected (S34: Yes), the first program 28 displays a list display screen which is not illustrated, on the display panel 31 (S35). The list display screen is a list of the article names and the article codes of the components without the construction photographs. The list display screen may further have the construction photograph solicitation icon 65 associated with the article name and the article code. Further, the list display screen further has a return icon. When the worker selects the return icon, the first program 28 displays the first screen again on the display panel 31 (S33).

The first program 28 of the communication terminal device 11 determines whether the construction photograph solicitation icon 65 is selected on the first screen, the fifth screen, or the list display screen (S36). When determining that the construction photograph solicitation icon 65 is not selected (S36: No), the first program 28 executes processing in step S54 (FIG. 6) described later. When determining that the construction photograph solicitation icon 65 is selected (S36: Yes), the first program 28 displays a sixth screen for accepting the solicitation of the construction photograph on the display panel 31 (S37).

FIG. 10B illustrates the sixth screen. The sixth screen has characters indicating the name of the house, characters indicating the type, the article name, the article code, and the like of a target component, a camera icon 73, and a folder designating icon 74. The camera icon 73 is an icon for accepting an instruction of imaging using the imaging device 33 of the communication terminal device 11. The folder designating icon 74 is an icon for accepting a designation of the photograph folder stored in the memory 25.

The first program 28 of the communication terminal device 11 determines whether the icon selected by the worker on the sixth screen is the camera icon 73 or the folder designating icon 74 (S41). When determining that the icon selected by the worker is the camera icon 73 (S41: CAMERA), the first program 28 launches the imaging program 29 using the above-described sharing function provided by the OS 27 (S42). Then, the first program 28 acquires the photograph data generated by the imaging program 29 (S43).

Explaining in detail, the first program 28 inputs, to the OS 27, a command including a program ID assigned to the first program 28 and a program ID assigned to the imaging program 29. The OS 27 launches the imaging program 29 indicated by the program ID included in the input command and passes the program ID of the first program 28 to the imaging program 29. The launched imaging program 29 performs imaging in accordance with an operation of the worker and generates photograph data, and passes the generated photograph data and the program ID of the first program 28 to the OS 27. The OS 27 passes the passed photograph data to the first program 28 indicated by the program ID passed together with the photograph data. The first program 28 acquires the photograph data from the imaging program 29 via the OS 27 (S43). The first program 28 may acquire a file path indicating the photograph data in place of the photograph data. The processing in step S43 in which the first program 28 acquires the photograph data is an example of photograph data acquisition processing. The processing in step S41 in which the first program 28 accepts the selection of the camera icon 73 is an example of processing of accepting a launch input. The processing in step S42 is an example of processing of launching an imaging program.

When determining that the folder designating icon 74 is selected by the worker in step S41 (S41: FOLDER), the first program 28 of the communication terminal device 11 displays a photograph folder on the display panel 31 (S44), accepts a selection of the photograph data stored in the photograph folder (S45), and acquires the photograph data selected by the worker. Explaining in detail, when determining that the folder designating icon 74 is selected, the first program 28 inputs a command to the OS 27 and acquires a path indicating a folder where the photograph data is stored. The first program 28 displays the folder indicated by the acquired path on the display panel 31. Then, the first program 28 acquires the photograph data or the file path indicating the photograph data selected by the worker, from one or more pieces of photograph data stored in the folder. The processing in step S45 is an example of photograph data acquisition processing.

Figure 6:
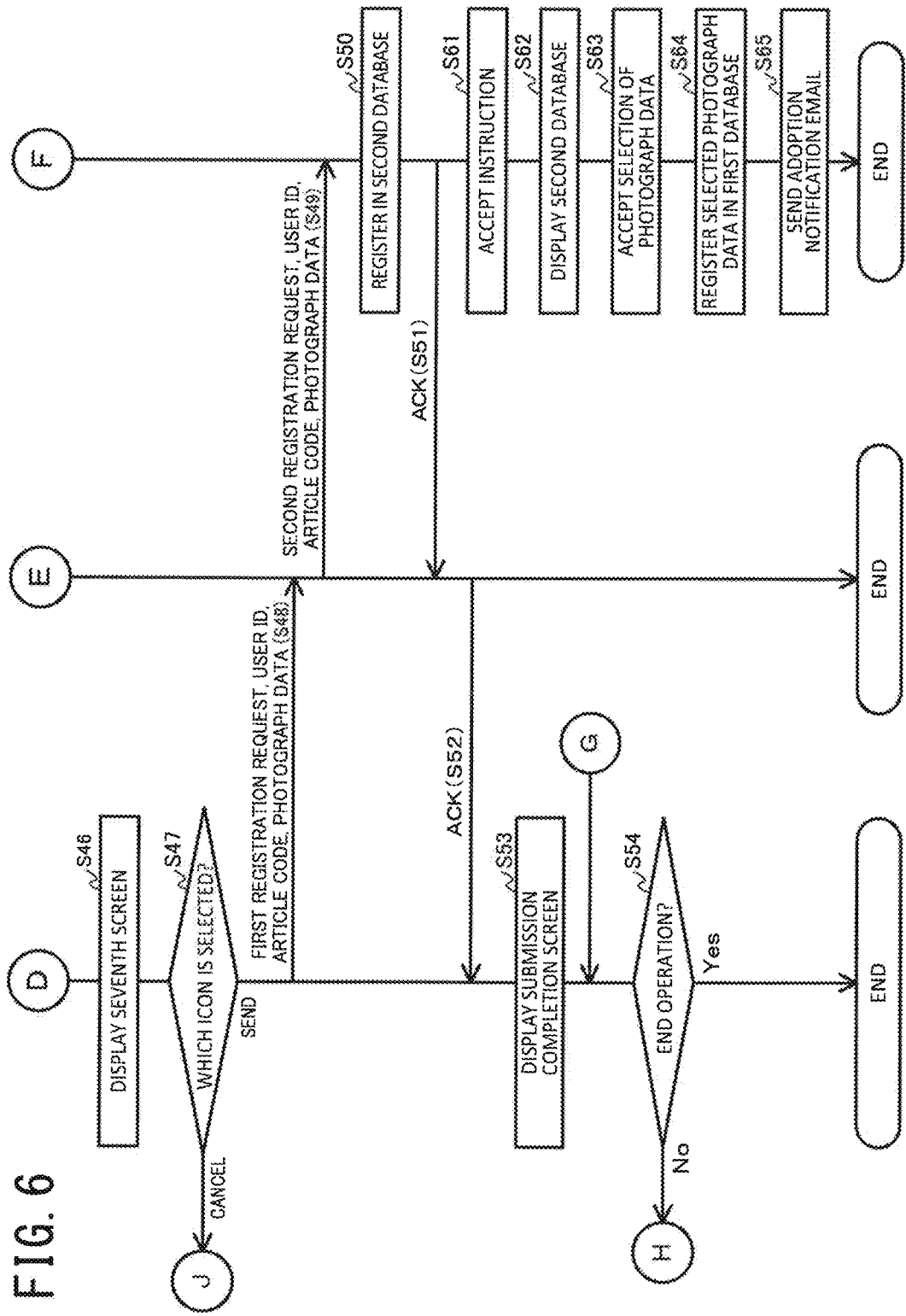
FIG. 6 is a view illustrating the continuation of the processing of FIG. 5.
Figure 11:
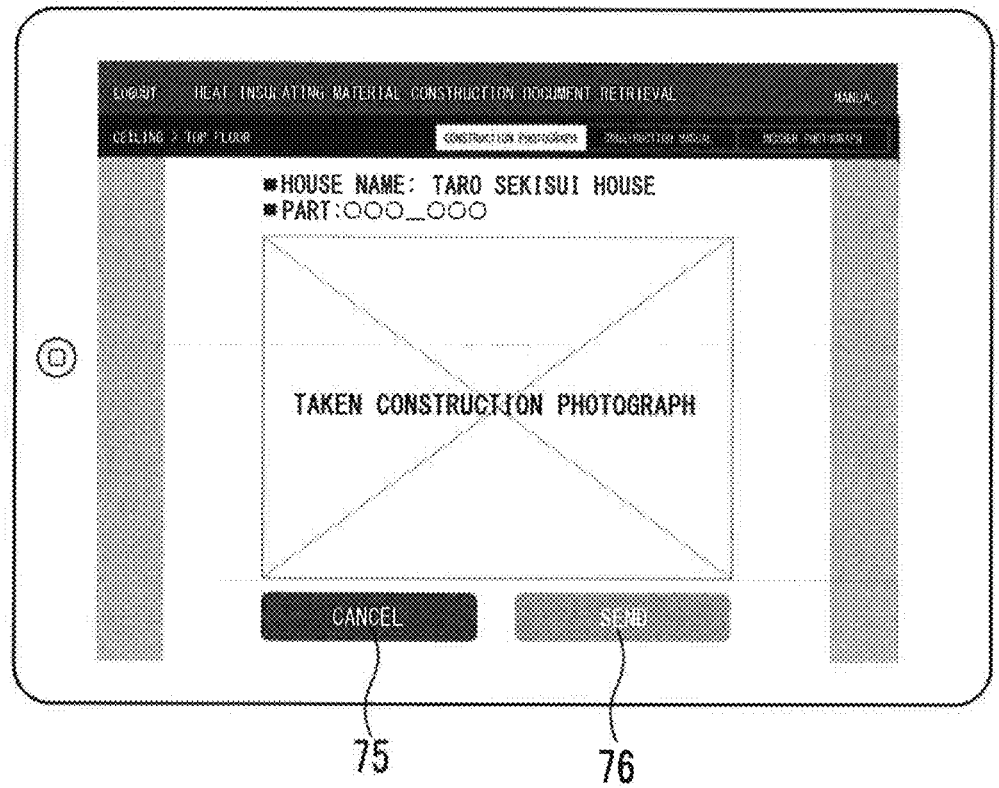
FIG. 11 is a view illustrating a seventh screen.

After executing the processing in steps S43, S45, the first program 28 of the communication terminal device 11 displays a seventh screen on the display panel 31 (S46) as illustrated in FIG. 6. As illustrated in FIG. 11, the seventh screen has a photograph shown by the photograph data acquired by the first program 28 in step S43 or S45, a cancel icon 75, and a send icon 76. The worker selects the cancel icon 75 when the worker retakes a photograph or reselects a photograph. The worker selects the send icon 76 when submitting the photograph.

After executing the processing in steps S43, S45, the first program 28 of the communication terminal device 11 determines whether the selected icon is the cancel icon 75 or the send icon 76 (S47), as illustrated in FIG. 6. When determining that the selected icon is the cancel icon 75 (S47: CANCEL), the first program 28 executes processing in and after step S37 (FIG. 5) again. In other words, the first program 28 displays the sixth screen (FIG. FIG. 10B) again on the display panel 31 and accepts the selection of the camera icon 73 or the folder designating icon 74.

When determining that the selected icon is the send icon 76 in step S47 (S47: SEND), the first program 28 of the communication terminal device 11 generates an HTTP request including a first registration request, the user ID, the article code, and the photograph data and sends the generated HTTP request to the first server 12 (S48). The first registration request is a command for requesting the registration of the attached photograph data in the second database and is a command interpretable by the second program 46 of the first server 12, for example. Step S48 is an example of second sending processing and fourth sending processing. The HTTP request sent in step S48 is an example of a second request.

Based on receiving the HTTP request sent by the communication terminal device 11 (S48), the second program 46 of the first server 12 generates a request including the user ID, the article code, and the photograph data included in the received HTTP request, and a second registration request, and sends the generated request to the second server 13 (S49). The second registration request is a command for requesting the registration of the attached photograph data in the second database and is a command interpretable by the third program 56 of the first server 12, for example.

Based on receiving the request sent by the first server 12 (S49), the third program 56 of the second server 13 generates a new record in the second database, and registers the user ID, the article code, and the photograph data included in the received request, in each field of the generated new record (S50). The third program 56 returns, to the first server 12, a response including an ACK which is an affirmative response, based on registering the photograph data and the like in the second database (S51). The processing in step S50 is an example of storing processing.

Based on receiving the response returned by the second server 13 and including the ACK (S51), the second program 46 of the first server 12 returns an HTTP response including an ACK to the communication terminal device 11 (S52).

Based on receiving the HTTP response sent by the first server 12 and including the ACK (S52), the first program 28 of the communication terminal device 11 displays, on the display panel 31, a submission completion screen which is not illustrated, indicating that the submission of the photograph has been completed (S53). The submission completion screen has a return icon. When the worker selects the return icon, the first program 28 displays the above-described first screen, fifth screen, or sixth screen again on the display panel 31. The first program 28 may display the submission completion screen on the display panel 31 only for a predetermined period of time, and then display the first screen, the fifth screen, or the sixth screen on the display panel 31.

The first program 28 of the communication terminal device 11 determines whether an end operation is performed (S54). The end operation is, for example, a selection of a logout icon displayed on the first screen, the second screen, the third screen, or the fifth screen, a power-off operation of the communication terminal device 11, or the like. When determining that the end operation is not performed (S54: No), the first program 28 executes the processing in and after step S33 again (FIG. 5). When determining that the end operation is performed (S54:Yes), the first program 28 finishes launching (End).

On the other hand, an operator of the second server 13 inputs an instruction to the third program 56 of the second server 13 using the operator terminal device connected to the second server 13 (S61). The third program 56 to which the instruction is input displays the second database on a display of the operator terminal device (S62). The operator selects one piece of photograph data from a plurality of pieces of photograph data registered for one article code in the displayed second database. For example, the photograph data of a file name "PHOTOGRAPH DATA A012-01" is selected from the plurality of pieces of photograph data registered in association with the article code "B031" illustrated in FIG. 3. As illustrated in FIG. 6, the third program 56 accepts the selection of the photograph data by the operator (S63), and registers the accepted photograph data in the first database (S64). Explaining in detail, the third program 56 reads, from the second database, the article code associated with the accepted photograph data, specifies, in the first database, a record with the article code matching the read article code, and registers the accepted photograph data in the field associated with the item name "CONSTRUCTION PHOTOGRAPH" in the specified record.

Based on executing the processing in step S64, the third program 56 of the second server 13 reads, from the second database, an email address associated with the photograph data accepted in step S63, and sends, to the read email address, the adoption notification email indicating that the submitted photograph is adopted as the construction photograph (S65). The second program 46 of the first server 12 may send the adoption notification email. In that case, the third program 56 of the second server 13 sends, to the first server 12, a request including the email address associated with the photograph data accepted in step S63. The second program 46 of the first server 12 sends the adoption notification email to the received email address.

A person who operates the communication system 10 may pay a consideration to the worker or the constructor who has submitted the photograph adopted as the construction photograph. In that case, the first program 28 of the communication terminal device 11 may display characters or figures indicating the payment of the consideration, on the display panel 31 in the first screen, the fifth screen, or the sixth screen.

Operational Effects of Embodiment

In this embodiment, the construction photograph solicitation icon 65 indicating that the construction photograph is solicited is displayed on the display panel 31 of the communication terminal device 11 for the components for which the construction photographs are not registered in the first database. Then, the photograph data sent by the worker is registered in the second database, and the photograph data registered in the second database is registered in the first database. Therefore, the communication system 10 and the programs 28, 46, and 56 used in the communication system 10 according to the present invention can easily acquire the construction photograph which is the photograph of the component after construction.

In this embodiment, since the presence/absence information indicating whether there is the construction photograph is registered in the first database, the third program 56 of the second server 13 can quickly determine whether there is the component without the construction photograph for a large number of components included in the house designated by the worker, for example.

In this embodiment, the user ID is sent from the communication terminal device 11 to the first server 12 together with the photograph data to be submitted, and the user ID is registered in the second database in association with the photograph data. Therefore, the communication system 10 enables the person who operates the communication system 10 to easily specify the worker or the constructor who has submitted the photograph.

In this embodiment, the first program 28 of the communication terminal device 11 launches the imaging program 29 using the sharing function provided by the OS 27 and acquires the photograph data. Therefore, the communication system 10 can reduce time and effort required for the worker to submit the photograph.

In this embodiment, the list display screen showing the list of the article names and the article codes for the components without the construction photographs is displayed on the display panel 31 of the communication terminal device 11. Therefore, the communication system 10 enables the worker to easily determine whether there is the construction photograph for the component to be constructed from now on.

Modification Example

The above-described embodiment describes an example in which the third program 56 of the second server 13 determines whether there is the construction photograph, and when there is the component without the construction photograph, the list information and the database information of the components without the construction photographs are sent to the communication terminal device 11. However, the first program 28 of the communication terminal device 11 may determine whether there is the component without the construction photograph. In this case, when determining that there are no construction photograph data associated with the article code or the article name in the received database information, the first program 28 displays the construction photograph solicitation icon 65 on the display panel 31. And, when determining that there are all the construction photograph data associated with the article code or the article name in the received database information, the first program 28 does not display the construction photograph solicitation icon 65 on the display panel 31. The processing in which the first program 28 determines whether there is the construction photograph data associated with the article code or the article name in the received database information is an example of determination processing. The first program 28 in this modification example is an example of a program.

Other Modification Examples

The above-described embodiment describes an example in which the first database and the second database are stored in the memory 54 of the second server 13. However, the first database and the second database may be stored in the memory 44 of the first server 12. In that case, the second program 46 of the first server 12 also executes processing to be executed by the third program 56 of the second server 13.

The above-described embodiment describes an example in which the first database and the second database are stored in the memory 54 of the second server 13. However, the first database or the second database may be stored in the memory 44 of the first server 12.

The above-described embodiment describes an example in which the first server 12 communicates with the communication terminal device 11. However, the third program of the second server 13 may communicate with the communication terminal device 11. In that case, the third program 56 of the second server 13 also executes processing to be executed by the second program 46 of the first server 12.

The above-described embodiment describes an example in which the communication terminal device 11 receives the HTTP response including the database information, generates the screen data for showing the screen such as the first screen or the second screen, using the received database information, and displays the first screen, the second screen, or the like on the display panel 31. However, the screen data such as for the first screen or the second screen may be generated by the second program 46 of the first server 12. The second program 46 generates an HTTP response including the screen data for showing the first screen, the second screen, or the like based on the database information acquired from the second server 13, and returns the generated HTTP response to the communication terminal device 11. The first program 28 of the communication terminal device 11 displays, on the display panel 31, the screen shown by the screen data included in the received HTTP response.

DESCRIPTION OF REFERENCE NUMERALS

- 10 communication system
- 11 communication terminal device
- 12 first server (server)
- 13 second server (server)
- 14 Internet
- 21 controller (first controller)
- 23 communication I/F (first communication interface)
- 28 first program
- 29 imaging program
- 31 display panel
- 32 touch sensor (input interface)
- 41 controller (second controller)
- 42 communication I/F (second communication interface)
- 46 second program
- 51 controller (second controller)
- 54 memory
- 56 third program

The invention claimed is:

1. A method for acquiring a construction photograph, comprising the steps:

executing a first process on a communication terminal device having a display panel, an input interface, and a first communication interface connected to an Internet; and executing a second process on a server having a second communication interface connected to the Internet, wherein the first process comprising the steps:

acceptance processing of accepting an input of information indicating a component, a house, or a customer through the input interface; and first sending processing of sending a first request to a communication address indicating the server through the first communication interface, the first request including specific information according to the information accepted by the acceptance processing and a return request of requesting a return of construction information, the second process comprising the steps:

acquisition processing of receiving the first request through the second communication interface, and acquiring the construction information associated with the specific information from a memory, based on a fact that the return request is included in the first request;

determination processing of determining whether the construction information acquired by the acquisition processing includes a construction photograph;

second sending processing of sending a first response having the construction information including the construction photograph through the second communication interface, based on determining that the construction photograph is included; and third sending processing of sending a second response having solicitation information and the construction information through the second communication interface, the solicitation information indicating that the construction photograph is solicited, based on determining that the construction photograph is not included, the first process further comprising the steps:

first display processing of displaying the construction information on the display panel, based on receiving the first response through the first communication interface;

second display processing of displaying the construction information and information according to the solicitation information on the display panel, based on receiving the second response through the first communication interface;

photograph data acquisition processing of acquiring photograph data, based on executing the second display processing; and fourth sending processing of sending a second request including the acquired photograph data to the communication address through the first communication interface, and the second process further comprising the steps:

storing processing of storing, in the memory, the photograph data included in the received second request.

2. The method according to claim 1, wherein the memory associatedly stores component information indicating the component, the construction information, and presence/absence information indicating presence or absence of the construction photograph, and the determination processing is processing of determining whether the presence/absence information associated with the component information of the component indicated by the specific information indicates that the construction photograph is not included.

3. The according to claim 1, wherein the second request includes a user ID indicating a worker, a constructor, or the communication terminal device, and the storing processing is processing of associatedly storing the photograph data and the user ID in the memory.

4. The method according to claim 1, wherein the communication terminal device further has an imaging device of performing imaging and outputting photograph data, and the photograph data acquisition processing includes:

processing of accepting a launch input through the input interface;

processing of launching an imaging program implemented on the communication terminal device using a sharing function provided by an OS implemented on the communication terminal device, based on accepting the launch input; and processing of acquiring the photograph data from the imaging program.

5. The method according to claim 1, wherein the memory associatedly stores component information indicating the component, the construction information, and presence/absence information indicating presence or absence of the construction photograph,
the third sending processing includes:
processing of acquiring the component information associated with the presence/absence information indicating that the construction photograph is absent; and
processing of sending the second response including, as the solicitation information, list information indicating a list of the acquired component information; and
the second display processing includes:
processing of displaying the list information on the display panel.

6. A communication system comprising:
a communication terminal device having a display panel, an input interface, a first communication interface connected to an Internet, and a first controller; and
a server having a second communication interface connected to the Internet and a second controller, wherein
the first controller executes:
acceptance processing of accepting an input of information indicating a component, a house, or a customer through the input interface; and
first sending processing of sending a first request to a communication address indicating the server through the first communication interface, the first request including specific information according to the information accepted by the acceptance processing and a return request of requesting a return of construction information,
the second controller executes:
acquisition processing of receiving the first request through the second communication interface, and acquiring the construction information associated with the specific information from a memory, based on a fact that the return request is included in the first request;
determination processing of determining whether the construction information acquired by the acquisition processing includes a construction photograph;
second sending processing of sending a first response having the construction information including the construction photograph through the second communication interface, based on determining that the construction photograph is included; and
third sending processing of sending a second response having solicitation information and the construction information through the second communication interface, the solicitation information indicating that the construction photograph is solicited, based on determining that the construction photograph is not included,
the first controller executes:
first display processing of displaying the construction information on the display panel, based on receiving the first response through the first communication interface;
second display processing of displaying the construction information and information according to the solicitation information on the display panel, based on receiving the second response through the first communication interface;
photograph data acquisition processing of acquiring photograph data showing the construction photograph, based on executing the second display processing; and
fourth sending processing of sending a second request including the acquired photograph data to the communication address through the first communication interface, and the second controller executes:
storing processing of storing, in the memory, the photograph data included in the received second request.

7. A process implemented on a communication terminal device having a display panel, an input interface, and a communication interface connected to an Internet,
the process comprising the steps:
acceptance processing of accepting an input of information indicating a component, a house, or a customer through the input interface;
first sending processing of sending a first request to a communication address indicating a server through the communication interface, the first request including specific information according to the information accepted by the acceptance processing and a return request of requesting a return of construction information;
first display processing of displaying the construction information on the display panel, based on receiving a first response through the communication interface, the first response being a response to the first request and having the construction information including a construction photograph;
second display processing of displaying the construction information and information according to solicitation information on the display panel, based on receiving a second response through the communication interface, the second response being a response to the first request and having the solicitation information and the construction information not including the construction photograph;
photograph data acquisition processing of acquiring photograph data showing the construction photograph, based on executing the second display processing; and
second sending processing of sending a second request including the acquired photograph data to the communication address through the communication interface.

8. A process implemented on a server having a communication interface connected to an Internet,
the process comprising the steps:
acquisition processing of acquiring, from a memory, construction information associated with specific information included in a first request, based on receiving the first request including a return request through the communication interface;
determination processing of determining whether the construction information acquired by the acquisition processing includes a construction photograph;
first sending processing of sending a first response having the construction information including the construction photograph through the communication interface, based on determining that the construction photograph is included;
second sending processing of sending a second response having solicitation information and the construction information through the communication interface, the solicitation information indicating that the construction photograph is solicited, based on determining that the construction photograph is not included;
receiving processing of receiving a second request including photograph data; and
storing processing of storing, in the memory, the photograph data included in the received second request.

9. A process implemented on a communication terminal device having a display panel, an input interface, and a communication interface connected to an Internet,
the process comprising the steps:

acceptance processing of accepting an input of information indicating a component, a house, or a customer through the input interface;

first sending processing of sending a first request to a communication address indicating a server through the communication interface, the first request including specific information according to the information accepted by the acceptance processing and a return request of requesting a return of construction information;

determination processing of determining whether the construction information includes a construction photograph, based on receiving a response through the communication interface, the response being a response to the first request and having the construction information;

first display processing of displaying, on the display panel, the construction information including the construction photograph, based on determining that the construction information includes the construction photograph;

second display processing of displaying, on the display panel, the construction information not including the construction photograph and solicitation information indicating that the construction photograph is solicited, based on determining that the construction information does not include the construction photograph;

photograph data acquisition processing of acquiring photograph data, based on executing the second display processing; and second sending processing of sending a second request including the acquired photograph data to the communication address through the communication interface.

* * * * *